Patented Dec. 10, 1929

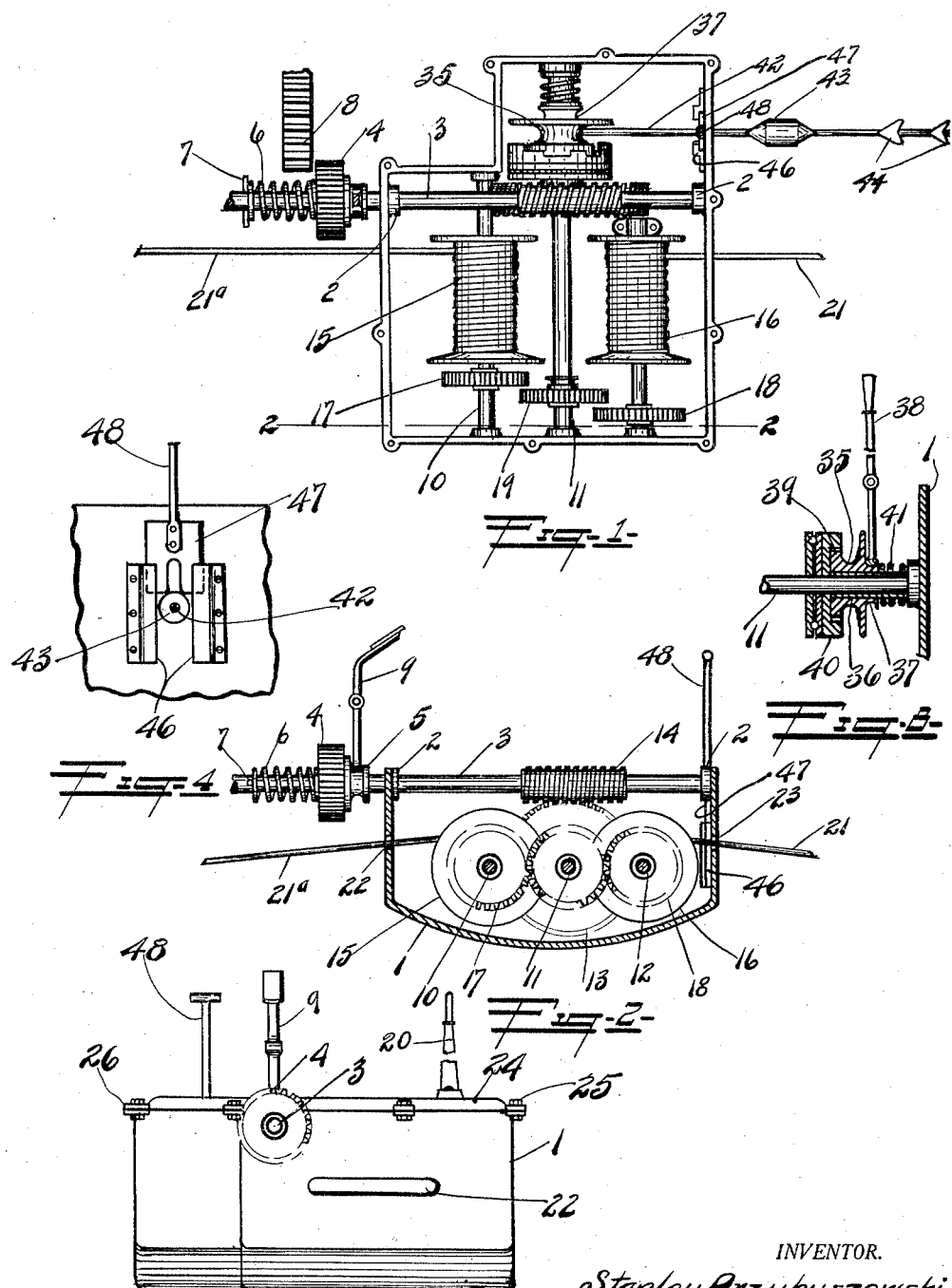

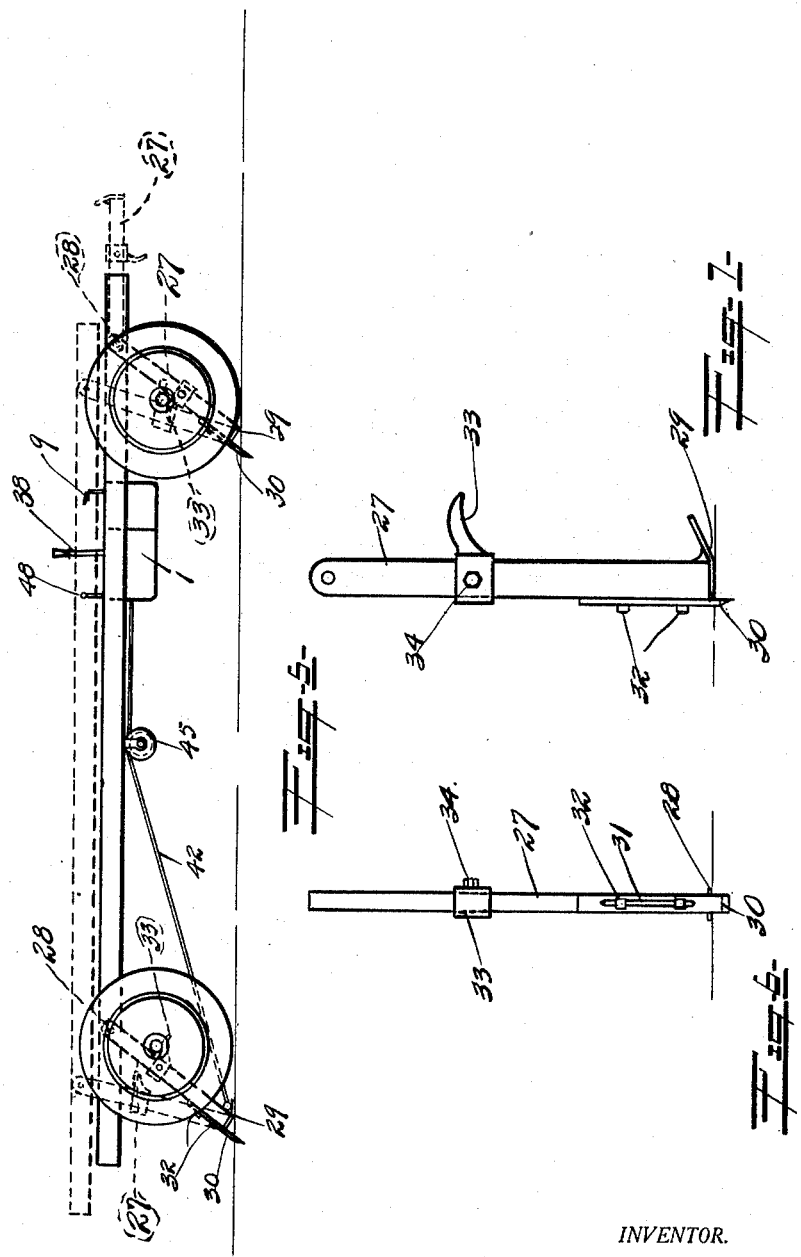

1,738,924

UNITED STATES PATENT OFFICE

STANLEY PRZYBYSZEWSKI, OF SAGINAW, MICHIGAN, ASSIGNOR TO STELLA MOWSCZYK, OF SAGINAW, MICHIGAN

POWER TAKE-OFF

Application filed December 13, 1928. Serial No. 325,757.

This invention relates to power take off mechanism and the like, and particularly to a mechanism adapted to be connected to a vehicle engine or power plant for transmitting power for various purposes.

One object of the invention is to provide a mechanism by means of which a vehicle may be jacked up or raised from the ground, for removing a tire or for any other purpose.

Another object is to design a mechanism by means of which a vehicle may be pulled from a ditch, or any place where traction cannot be secured, by use of its own power.

A further object is to design a simple mechanism which can be secured in the vehicle frame directly adjacent the conventional transmission, and which can be shifted into and out of operative engagement with the flywheel of the power plant.

Another object is to provide adjustable means for raising the vehicle clear of the ground, and which when swung up will form braces for the usual front and rear bumpers.

With the above and other objects in view, the present invention consists in the combination and arrangement of parts, hereinafter more fully described, illustrated in the accompanying drawing, and particularly pointed out in the appended claim, it being understood that changes may be made in the form, size, proportion and minor details of construction without departing from the spirit or sacrificing any of the advantages of the invention.

In the drawings—

Fig. 1 is a top plan view of the power take off mechanism.

Fig. 2 is a transverse sectional end view taken on the line 2—2 of Fig. 1 and showing the shifting levers.

Fig. 3 is a front view of the housing illustrating the slot therein.

Fig. 4 is an enlarged fragmentary view illustrating the means for locking the lifting cable in position.

Fig. 5 is a side view of a vehicle chassis illustrating the power take off in place, and the means for raising or jacking the vehicle.

Fig. 6 is an edge view of one of the props.

Fig. 7 is a side view thereof.

Fig. 8 is a fragmentary sectional view of the vehicle lifting drum and clutch mechanism.

Referring now particularly to the drawings in which I have shown the preferred embodiment of my invention, the numeral 1 indicates a housing, having bearings 2 formed integral therewith, and adapted to receive a longitudinally disposed shaft 3 which is journaled therein in the usual manner.

A spur gear 4 is mounted on this shaft 3, outside of the housing, and a conventional feather key (not shown) permits of longitudinal movement of the gear on the shaft, a collar 5 being fixed to the hub of the said gear to facilitate the shifting thereof in a manner to be presently explained.

A coiled spring 6 is mounted on the shaft 3 on the opposite side of the gear 4 and a pin 7 extends transversely through the shaft and forms a stop for said spring.

The fly wheel of the engine or power plant is indicated by the numeral 8, and is generally toothed for engagement by the starter mechanism (not shown), the gear 4 being shifted into engagement therewith by means of a foot pedal 9 having a yoke on the one end thereof which engages the collar 5.

A plurality of transversely disposed shafts 10, 11 and 12 are mounted in suitable bearings formed in the housing, a worm wheel 13 being mounted on the shaft 11, meshing with and being driven by a worm 14 carried on the shaft 3, grooved drums 15 and 16 respectively are mounted on the shafts 10 and 12, and gears 17 and 18 are also mounted on said shafts, a similar gear 19 being mounted on the shaft 11, and is shiftable into engagement with either one or the other of the said gears 17 or 18 for rotation of the drums 15 or 16, a shifter lever 20 being provided to facilitate said shifting.

Cables 21 and 21ª are anchored to each respective drum and lead through slotted openings 22 and 23 formed in opposite sides of the housing, and when the vehicle wheels are in sand, mud, or a ditch, or in any place or position where there is no traction for the wheels, it is only necessary to take one of the cables 21 or 21ª, (depending on whether it is desired to move backwards or forward), place an anchor (not shown) in the ground, and attach the end of one of the cables thereto, then shift the gear 4 into engagement with the flywheel of the engine, and the gear 19 into engagement with either of the gears 17 or 18, thereby rotating one of the drums, winding the cable thereon, and moving the vehicle accordingly.

A cover 24 forms a closure for the mechanism and is held in position by means of bolts 25 extending through the lugs 26 cast integral with the housing, suitable openings being formed in the cover to accommodate the shifting lever.

A prop 27 is pivotally secured to each corner of the vehicle frame by means of the bolt 28, said props being shaped as clearly shown in Figs. 6 and 7 of the drawings, the lower end of each prop having a foot or shoe 29 formed integral therewith, and a short prong shaped member 30 is adjustably secured to one side of the prop, said member being slotted as shown at 31, and studs 32 extend through said slotted opening to secure the member firmly in adjusted position. A laterally projecting leg 33 is slidably mounted on each prop member 27 and is secured in position by means of a bolt 34, this leg being adapted to engage the under side of the axle member 35 and tends to keep the axle in spaced relation to the frame proper when the vehicle is raised.

The mechanism for raising is mounted on the transversely disposed shaft 11 and comprises a drum 35 slidably mounted on a sleeve 36, one end of said drum having a collar 37 formed integral therewith, and which is adapted to receive the shifting lever 38, the opposite end forming the male part of a clutch 39, the female portion 40 of said clutch being of larger diameter, and is solid on the shaft 11. A coiled spring 41 is interposed between the housing bearing and the collar 37, and normally tends to force the drum endwise and the clutch into positive engagement.

A cable 42 is anchored to the drum 35 in any desired manner, and leads through a suitable opening formed in the back of the housing, an enlarged stop 43 being secured to said cable and provided with tapered ends as shown. A plurality of spaced apart lugs 44 are also provided intermediate the length of said cable, and serve to engage the housing in a manner to be presently described.

The free end of the cable 42 leads rearwardly over a sheave 45 which is hung from the vehicle frame and is secured to one of the props 27, and when desiring to jack or raise the vehicle the gear 4 is shifted into engagement with the flywheel, the clutch 39 is then engaged and the cable will be wound on the drum 35 until the stop 43 is drawn between the flange of the drum and edges of the member 40. This will shift the drum 35 longitudinally on the sleeve 36 releasing the clutch. The vehicle must now be held in raised position and this is accomplished by providing a pair of clips 46 in which the plate 47 is slidably mounted, and which is manipulated by means of a handle 48 secured thereto, said plate being slotted or forked to receive the cable 42 and when the plate is lowered it is engaged by one of the lugs 44 thereby holding the vehicle in adjusted raised position. Release is effected by raising the plate to allow for the passage of the lugs.

When the props are not in use they can be swung up alongside the frame as indicated in the dotted lines in Fig. 5, being held in this position in any approved manner, and a band of metal (not shown) can be secured to each respective foot to form a bumper if desired.

From the foregoing description it will be obvious that I have perfected a very simple and inexpensive power take off mechanism for use on motor vehicles and the like.

What I claim is:—

The combination with the chassis of a vehicle having props pivotally secured to the frame thereof, of a power take off comprising a housing, a transversely disposed shaft journaled therein, a drum mounted thereon, a cable anchored to the drum and connecting with one of said props, spaced apart lugs on said cable, and means in the housing for engaging said lugs for holding it in adjusted position.

In testimony whereof I affix my signature.

STANLEY PRZYBYSZEWSKI.